(12) United States Patent
Schellenberg et al.

(10) Patent No.: US 7,097,935 B2
(45) Date of Patent: Aug. 29, 2006

(54) RECHARGEABLE BATTERY

(75) Inventors: Peter Schellenberg, Wunstorf (DE); Hans Muehe, Hildesheim (DE)

(73) Assignee: VB Autobatterie GmbH, Hannover (DE)

( * ) Notice: Subject to any disclaimer, the term of this patent is extended or adjusted under 35 U.S.C. 154(b) by 151 days.

(21) Appl. No.: 10/712,737

(22) Filed: Nov. 13, 2003

(65) Prior Publication Data

US 2004/0142231 A1  Jul. 22, 2004

(30) Foreign Application Priority Data

Nov. 26, 2002  (DE) ................................ 102 54 950

(51) Int. Cl.
*H01M 2/04* (2006.01)

(52) U.S. Cl. .......................... 429/82; 429/72; 429/175
(58) Field of Classification Search .................. 429/72, 429/175
See application file for complete search history.

(56) References Cited

U.S. PATENT DOCUMENTS

| | | | |
|---|---|---|---|
| D310,821 S | 9/1990 | Hulsebus et al. | |
| 5,283,137 A | 2/1994 | Ching | |
| 5,284,720 A | 2/1994 | Thuerk et al. | |
| 5,415,956 A | 5/1995 | Ching | |
| 5,599,641 A | 2/1997 | Ching, Jr. et al. | |
| 5,674,640 A | 10/1997 | Mrotek et al. | |
| 5,688,612 A | 11/1997 | Mrotek et al. | |
| 5,702,841 A | 12/1997 | Thomas et al. | |
| 5,843,593 A * | 12/1998 | Fritts et al. | 429/84 |
| 5,856,037 A | 1/1999 | Casale et al. | |
| 6,143,438 A | 11/2000 | Geibl et al. | |
| 6,255,014 B1 | 7/2001 | Dougherty et al. | |
| 6,277,517 B1 | 8/2001 | Thomas et al. | |
| D450,035 S | 11/2001 | Ahlgren | |
| 6,461,758 B1 * | 10/2002 | Geibl et al. | 429/72 |

FOREIGN PATENT DOCUMENTS

| | | |
|---|---|---|
| DE | 0 523 273 B1 | 1/1993 |
| DE | 0 570 703 B1 | 11/1993 |

* cited by examiner

*Primary Examiner*—John S. Maples
(74) *Attorney, Agent, or Firm*—Foley & Lardner LLP

(57) ABSTRACT

A rechargeable battery includes a housing having at least two cells and a cover which closes the housing. The cover includes a lower part which is coupled to the housing, an upper part which is arranged at a distance from the lower part and closes the lower part forming a seal, and labyrinth-like outlet channels provided between the lower part and the upper part for acid deposition. The lower part is cut through in the area of the upper part adjacent to the outlet channels. The cells in the cut-through areas are separated from one another in a liquid-tight manner by cell separating wall sections which are adjacent to the upper part, and which are closed by the upper part.

10 Claims, 3 Drawing Sheets

RECHARGEABLE BATTERY

CROSS-REFERENCE TO RELATED PATENT APPLICATIONS

Germany Priority Application DE 102 54 950.8-45, filed Nov. 26, 2002, including the specification, drawings, claims and abstract, is incorporated herein by reference in its entirety.

BACKGROUND OF THE INVENTION

The present invention relates to a rechargeable battery (e.g., a lead-acid battery for use in vehicle starting, lighting, and ignition applications, etc.).

EP 0 523 273 B1 describes a rechargeable battery with a plastic housing in which two or more cells are arranged. Normally, there are 6 cells. The cover comprises a lower part, which is fitted to the housing such that it is liquid-tight and gastight, having in each case one filling and monitoring opening per cell, which can be closed by a sealing plug. An upper part is fitted to the lower part at a distance from the lower part, with labyrinth-like cavities for acid deposition being formed on the channel walls of each cell between the lower part and the upper part. Gas and liquid can flow through the filling and monitoring openings in the lower part, past the sealing plug, into the cavities. In order to dissipate the gases which are produced during operation of the lead-acid rechargeable battery, the degassing system which is formed by the cavities is provided with at least one degassing opening, which has ignition protection in the form of a flame trap valve.

EP 0 570 703 B1 describes a similar rechargeable battery, whose housing is likewise completely closed by the lower part and in which an upper part is arranged at a distance from the lower part, and a gas collection area for acid deposition is formed between the lower part and the upper part. Once again, the sealing plug extends down into the plane of the lower part. A gas outlet point is provided in the area of the sealing plug in the plane of the lower part, and is of such a size that, in the event of brief tilting up to 180° C., no more acid can emerge from the gas area of the respective cell, than is held by the cavity associated with it.

U.S. Pat. No. 5,843,593 discloses a leak-proof battery cover for an energy storage battery, which has a labyrinth formed by passages between each cell valve and an atmospheric valve. The cavities, which are in the form of a labyrinth, are designed such that a portion of each path of the labyrinth is always kept above the level reached by the electrolyte in the associated cell when the battery is tilted onto any of its sides, or is rotated through 90° from its upright position. This labyrinth arrangement prevents electrolyte from reaching the atmospheric valve and from emerging from the battery.

It would be advantageous to provide an improved rechargeable battery which has a battery cover which can be produced at a lower price and in a relatively efficient manner. It would also be advantageous to provide a rechargeable battery having a battery cover in which return flow of electrolyte which has been collected in the cavity into the cell is improved. It would also be advantageous to provide a rechargeable battery and cover in which the risk of static discharging in the cover is reduced. It would be advantageous to provide a battery having a cover that includes any one or more of these or other advantageous features.

SUMMARY

An exemplary embodiment relates to a rechargeable battery. The rechargeable battery includes a housing having at least two cells and a cover which closes the housing. The cover includes a lower part which is coupled to the housing, an upper part which is arranged at a distance from the lower part and closes the lower part forming a seal, and labyrinth-like outlet channels provided between the lower part and the upper part for acid deposition. The lower part is cut through in the area of the upper part adjacent to the outlet channels. The cells in the cut-through areas are separated from one another in a liquid-tight manner by cell separating wall sections which are adjacent to the upper part, and which are closed by the upper part.

BRIEF DESCRIPTION OF THE DRAWINGS

The invention will be explained in more detail in the following text with reference to attached drawings, in which.

DETAILED DESCRIPTION OF THE PREFERRED AND EXEMPLARY EMBODIMENTS

Figure 1:
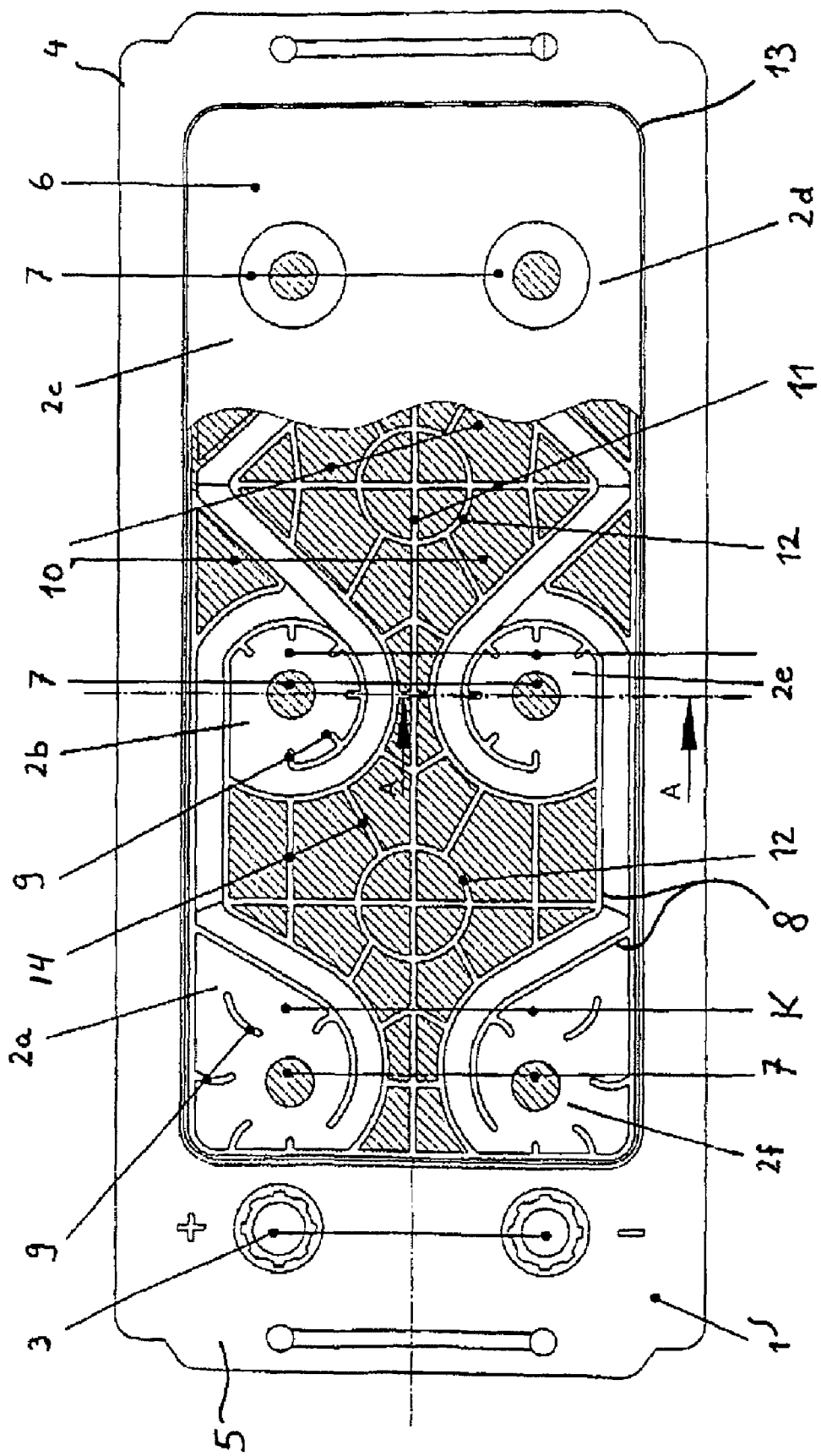
FIG. 1 shows a plan view of a rechargeable battery according to an exemplary embodiment, with the cover partially cut away and with cut-through areas in the lower part.

An exemplary embodiment relates to a battery (e.g., a rechargeable lead-acid battery for use in vehicle starting, lighting, and ignition applications) having a housing which has two or more cells (e.g., six cells) and having a cover which closes the housing. The cover includes a lower member or part which is fitted to the housing and an upper member or part which is arranged at a distance from the lower part. The upper part closes the lower part, forming a seal. Labyrinth-like outlet channels are formed between the lower part and the upper part for acid deposition.

According to an exemplary embodiment, the lower part of the cover is cut through in the area of the upper part adjacent to the outlet channels, and the cells in the cut-through areas are separated from one another in a liquid-tight manner by cell separating wall sections which are adjacent to the lower part, and are closed by the upper part.

It is therefore proposed that cut-through areas be provided in the lower part adjacent to the outlet channels, which are in the form of labyrinths, rather than completely closing the housing by the lower part in the conventional manner. In these cut-through areas, the cells are then separated from one another in a liquid-tight manner by means of cell separating wall sections, and are closed by the upper part. One advantageous feature of such an arrangement is that the cavity area is considerably reduced. This has the advantage that the outlet channels can be designed to be shorter and that electrolyte can flow more quickly from the cavities into the cells. Furthermore, the risk of static discharging in the area of the upper part and lower part, which are located one above the other, is considerably reduced since the majority of the cell is now closed only by one wall, namely the upper part.

According to an exemplary embodiment, the lower part in the cut-through areas includes a supporting structure with ribs, which form the cell separating wall sections and which are aligned with the cell separating walls of the cells of the housing. The ribs are integrally connected to the cell separating walls and to the upper part (e.g., by welding) such that the cells are separated from one another in a liquid-tight manner once the cover has been fitted. The ribs advantageously stiffen the cover, and the cells are closed in a relatively cost-effective manner once the cover has been fitted to the housing (e.g., welding, adhesive bonding, or clamping the ribs to the cell separating walls).

According to an exemplary embodiment, channel walls are fitted to the lower part adjacent to the cut-through areas to form labyrinth-like outlet channels. Reinforcing webs are provided in the outlet channels according to an exemplary embodiment, by means of which the cover is stabilized when the upper part is fitted to the lower part.

Webs which are used to make the cover more robust are also provided in the lower part according to an exemplary embodiment, between the ribs as well as between the ribs and the channel walls. The webs are preferably integrally connected to the upper part, for example by welding or adhesive bonding, during the production of the cover, so that no electrolyte drops can be held in intermediate spaces.

According to an exemplary embodiment, the upper part is connected to the ribs, to the channels walls, to the reinforcing webs and/or to the webs by welding. This type of production is relatively simple, reliable and cost-effective.

In order to reduce the droplet formation of electrolyte in the cover, the upper surface of the upper part and/or of the lower part is preferably roughened in the area of the outlet channels.

It is also advantageous for each of the outlet channels to be inclined towards an outlet opening in the lower part, which opens into the associated cell. This ensures that any electrolyte which is located in the cavity flows back quickly once again into the cell, and that the cavities are free of electrolyte in the normal state during operation of the rechargeable battery.

A degassing opening, which is provided with ignition protection, may be connected to the outlet channels in a known manner such that they communicate, in order to dissipate gas from the rechargeable battery.

FIG. 1 shows a rechargeable battery 1 which has a plastic (e.g., polypropylene) housing in which, for example, six cells 2a, 2b, 2c, 2d, 2e and 2f are arranged in two rows. The cells 2a–2f are closed off from one another by means of cell walls.

Electrical loads may be connected to the rechargeable battery 1 via two poles or terminals 3. The housing, which is open at the top, is closed by a cover 4 comprising a thermoplastic material (e.g., polypropylene). This cover 4 has a lower part or member 5 and an upper part or member 6 which is arranged at a distance from the lower part 5. The upper part 6 is in the form of a cover plate and extends over a portion of the lower part 5. According to an exemplary embodiment, the upper part 6 is provided at least over filling and monitoring openings 7 which are provided in the lower part 5.

Channel walls 8 (e.g., channel separating walls or structures) which form or define labyrinth-like outlet channels K are arranged on the upper face of the lower part 5. The labyrinth-like channels each run from the filling and monitoring opening 7 of a cell to a filling and monitoring opening 7 of at least one adjacent cell, so that the cells are connected to one another by the channels, which form cavities, such that they communicate. Furthermore, reinforcing webs or elements 9 are provided in the cavities in order to support the upper part 6 and to make the cover 4 robust.

Adjacent to the outer channels walls 8, the lower part 5 has cut-through areas 10 (e.g., openings, apertures, etc.), so that the cells are covered only by the upper part 6 of the cover 4 in the cut-through areas 10.

In order to separate the cells, cell separating wall sections in the form of ribs 11 are provided in the lower part 5. The ribs 11 are connected (e.g., attached, coupled, etc.) to the upper part 6, for example by adhesive bonding, welding, or clamping, and are aligned with the cell walls of the cells. Once the cover 4 has been fitted to the housing of the rechargeable battery 1, the ribs 11 are connected in a liquid-tight manner to the cell walls, for example by adhesive bonding, welding or clamping.

The ribs 11 form a supporting structure for the channel walls 8 of the degassing system and for the cover 4 to provide enhanced robustness. The ribs 11 are connected or coupled to one another by means of circular webs or elements 12, so that the supporting structure is made more robust. Furthermore, webs or elements 14 are provided which extend between the ribs 11 or webs 12 and the channel walls 8.

The cavities and channels which are in the form of labyrinths and form the degassing system are inclined towards the filling and monitoring openings 7 of the respectively associated cell, so that electrolyte can flow back into the cell again relatively quickly. The surfaces of the lower part 5 and of the upper part 6 are preferably roughened in the area of the channels, thus largely preventing the formation of electrolyte droplets. The channels of the partial degassing systems for the cells are connected to one another and end in at least one degassing opening, which is not illustrated but is preferably provided with a flame protection trap.

During the production of the rechargeable battery, the upper face of the cover 4 is closed by the upper part 6 by connecting the upper part 6 to the lower part 5 along the ribs 11, the webs 9, 12, and 14, and along a circumferential edge 13 of the lower part 5 (e.g., by means of adhesive bonding or welding). The assembled cover 5 is then placed onto the housing of the rechargeable battery 1 and is firmly connected to it in a liquid-tight manner. In the process, the ribs 11 are connected to the cell separating walls in a liquid-tight manner, so that the ribs 11 form cell separating wall sections of the cells in the area of the cover 4.

Figure 2:
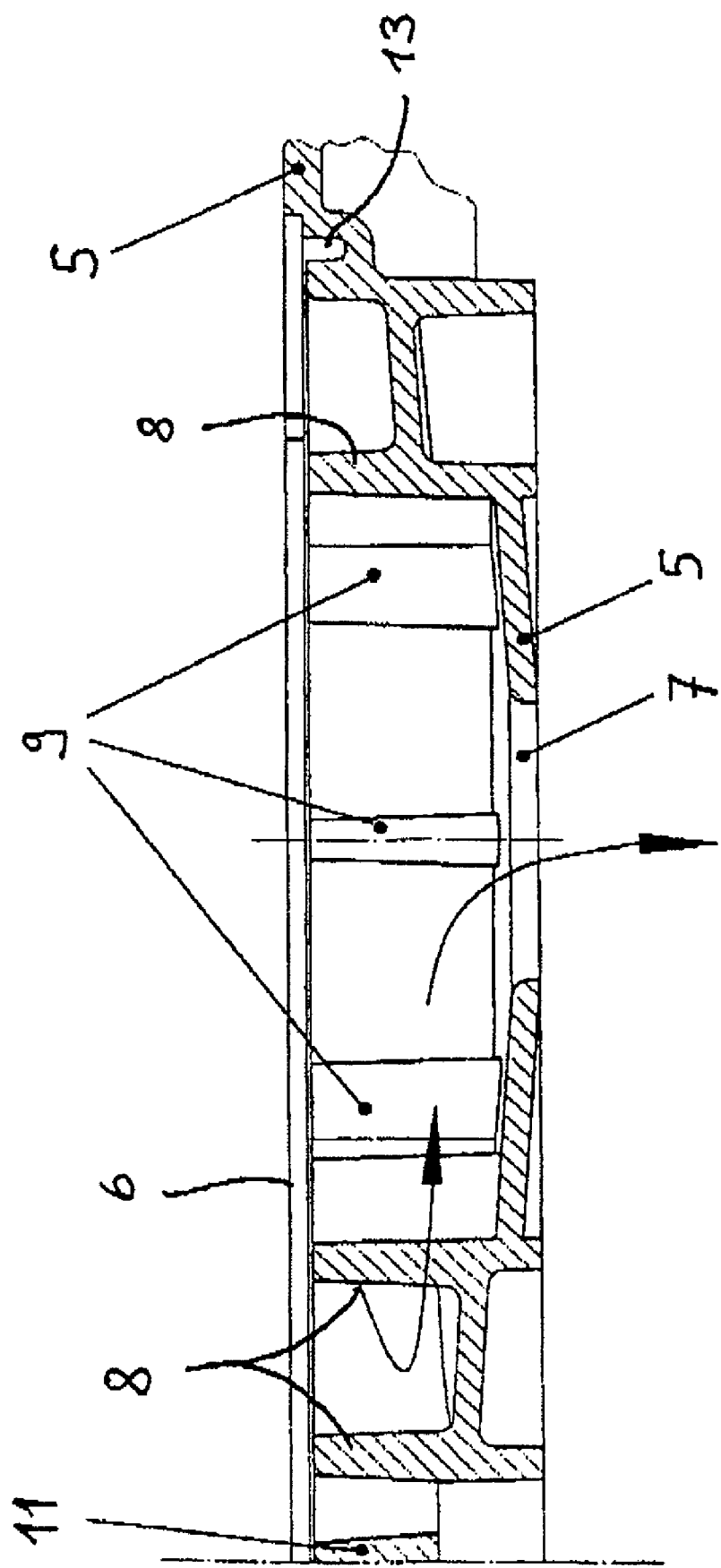
FIG. 2 shows a section view of the rechargeable battery shown in FIG. 1 taken along the line A—A.

FIG. 2 shows the cover illustrated in FIG. 1 in the form of a section along the line A—A in FIG. 1. This clearly shows that channel walls 8 are formed in the lower part 5, in order to temporarily store electrolyte and gas from filling and monitoring openings 7 in the lower part 5 by means of labyrinth-like channels in the intermediate space between the lower part 5 and the upper part 6. The upper part 6 is in this case fitted in a liquid-tight manner to the channel walls 8 of the upper part 6, and is clamped into a circumferential edge 13 on the lower part 5. In order to ensure that the cover is sufficiently robust, reinforcing webs 9 are provided which extend from the lower part 5 to the upper part 6 in the area of the channels.

A rib 11 can also be seen, which extends such that it is aligned with the cell separating walls (which are not illustrated) in the housing of the rechargeable battery 1 and is integrally connected to these walls in a liquid-tight manner.

Figure 3:
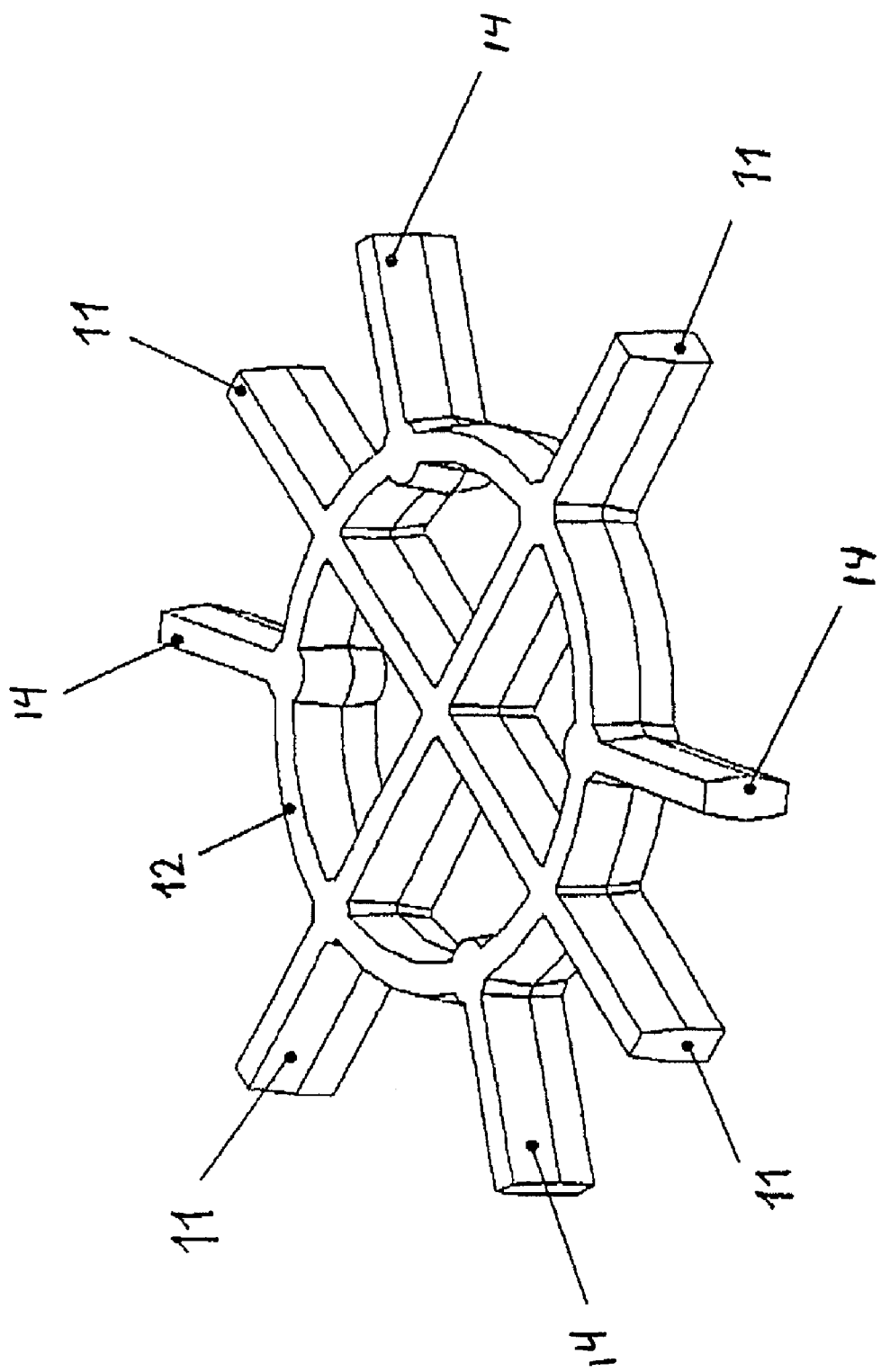
FIG. 3 shows a perspective view of a detail of a supporting structure for the lower part, with ribs and webs.

FIG. 3 shows a perspective view of a supporting structure with cruciform ribs 11 which are made robust by means of circular web 12. Further webs 14 extend from the web 12 in the direction of the channel separating walls of the lower part 5. The ribs 11 are aligned such that they are aligned with the cell separating walls of the cells of the housing, and form cell separating wall sections in the area of the cover 4. In contrast, the webs 12 and 14 are used to make the cover robust.

It is important to note that the construction and arrangement of the elements of the battery housing and cover as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials (such as high-impact plastic) in any of a wide variety of colors, textures and combinations. Other substitutions, modifications, changes and omissions may be made in the design, operating conditions and arrangement of the preferred and other exemplary embodiments without departing from the scope of the present inventions.

What is claimed is:

1. A rechargeable battery comprising:
   a housing having at least two cells; and
   a cover which closes the housing, the cover comprising a lower part which is coupled to the housing, an upper part which is arranged at a distance from the lower part and closes the lower part forming a seal, and outlet channels provided between the lower part and the upper part for acid deposition and forming a labyrinth;
   wherein the lower part comprises cut-through areas opening into the housing adjacent to the outlet channels;
   wherein the cells in the cut-through areas are separated from one another in a liquid-tight manner by cell separating wall sections which are adjacent to the upper part, and which are closed by the upper part;
   wherein the lower part includes at the position of the cut-through areas a supporting structure with ribs which form the cell separating wall sections, wherein the cell separating wall sections are lined with cell separating walls in the housing and are integrally connected to the cell separating walls and to the upper part; and
   wherein the lower part also includes at least one web which extends along the cut-through areas between at least two of the ribs and at least one web which extends along the cut-through areas between at least one of the ribs and at least one wall of at least one of the outlet channels.

2. The rechargeable battery of claim 1 wherein the lower part includes channel walls adjacent to the cut-through areas in order to form the labyrinth-like outlet channels.

3. The rechargeable battery of claim 2 wherein the outlet channels include reinforcing webs.

4. The rechargeable battery of claim 1 wherein the cells are connected to one another by means of the outlet channels such that they communicate.

5. The rechargeable battery of claim 1 wherein each of the webs are connected to the upper part.

6. The rechargeable battery of claim 1 wherein the upper part is welded to at least one of (a) at least one of the reinforcing webs included in the outlet channels, (b) at least one of the ribs which form the cell separating wall sections, (c) a wall of an outlet channel; (d) at least one of the webs which extend between the ribs; and (e) at least one of the webs which extend between at least one of the ribs and at least one wall of at least one of the outlet channels.

7. The rechargeable battery of claim 1 wherein at least one of the upper part the lower part has a roughened surface in the area of the outlet channels.

8. The rechargeable battery of claim 1 wherein the outlet channels are each inclined towards an outlet opening provided in the lower part which opens into a cell.

9. The rechargeable battery of claim 1 further comprising a filling and monitoring opening which can be closed by means of a sealing plug provided for each cell in the cover.

10. The rechargeable battery of claim 1 further comprising at least one degassing opening which is provided with ignition protection and is connected to the outlet channels such that they communicate.

* * * * *